(12) United States Patent
Bracken et al.

(10) Patent No.: US 7,611,547 B2
(45) Date of Patent: Nov. 3, 2009

(54) AIRBAG DYEING COMPOSITIONS AND PROCESSES

(75) Inventors: Anna Bracken, Beaverton, OR (US); Chang Yihua, Portland, OR (US)

(73) Assignee: Nike, Inc., Beaverton, OR (US)

( * ) Notice: Subject to any disclaimer, the term of this patent is extended or adjusted under 35 U.S.C. 154(b) by 325 days.

(21) Appl. No.: 11/589,299

(22) Filed: Oct. 30, 2006

(65) Prior Publication Data

US 2008/0098536 A1    May 1, 2008

(51) Int. Cl.
*D06P 5/00* (2006.01)

(52) U.S. Cl. .................. 8/506; 8/515; 8/607; 8/608; 8/609; 8/611; 8/617

(58) Field of Classification Search .......... 8/506, 8/515, 607, 608, 609, 611, 617
See application file for complete search history.

(56) References Cited

U.S. PATENT DOCUMENTS

| | | | |
|---|---|---|---|
| 3,901,648 A | 8/1975 | Arbaud | |
| 4,204,879 A * | 5/1980 | Paskins et al. | 106/311 |
| 4,918,838 A | 4/1990 | Chang | |
| 6,562,427 B2 | 5/2003 | Hung | |
| 6,733,543 B2 | 5/2004 | Pyles et al. | |
| 6,749,646 B2 | 6/2004 | Pyles et al. | |
| 6,797,215 B2 | 9/2004 | Bonk et al. | |
| 2003/0170463 A1 | 9/2003 | Watkins | |

FOREIGN PATENT DOCUMENTS

| | | | |
|---|---|---|---|
| GB | 711766 | * | 7/1954 |
| GB | 993758 | | 6/1965 |

OTHER PUBLICATIONS

PCT/US2007/021193, International Search Report, dated Apr. 4, 2008.

* cited by examiner

*Primary Examiner*—Eisa B Elhilo
(74) *Attorney, Agent, or Firm*—Banner & Witcoff, Ltd.

(57) ABSTRACT

A process for dyeing a thermoplastic elastomeric substrate comprising immersing the substrate into a dye system comprising at least one metal complex dye and a solvent system comprising water and an organic solvent. The organic solvent may be soluble, partially miscible with water or insoluble or nearly insoluble in water. In particular, the substrate is an inflated bladder such as an airbag used in athletic shoes.

25 Claims, No Drawings

AIRBAG DYEING COMPOSITIONS AND PROCESSES

FIELD OF THE INVENTION

The invention relates to dyes, dye/solvent compositions, and processes for dying substrates such as airbags and other inflatable bladders.

BACKGROUND OF THE INVENTION

Thermoplastic and thermoset polymeric materials have been widely used in the construction of inflatable bladders. Inflatable bladders have been used in a variety of products such as vehicle tires, balls, accumulators used on heavy machinery, and in footwear, especially shoes, such as for cushioning devices. The bladders may be made of elastic materials, or elastomers, which are able to substantially recover their original shape and size after removal of a deforming force, even when the part has undergone significant deformation.

Footwear, and in particular shoes, usually include two major components, a shoe upper and a sole. The general purpose of the shoe upper is to enclose the foot. For example, the shoe upper may be made from an attractive, highly durable, comfortable material or combination of materials. The sole, constructed from a durable material, is designed to provide traction and to protect the foot during use. The sole also typically serves the important function of providing enhanced cushioning and shock absorption during athletic activities to protect the feet, ankles, and legs of the wearer from the considerable forces generated. For example, during running, the force of impact generated can amount to two or three times the body weight of the wearer, while other athletic activities such as playing basketball may generate forces of between six and ten times the body weight of the wearer. Many shoes, particularly athletic shoes, now include some type of resilient, shock-absorbent material or components to cushion the foot and body during strenuous athletic activity. These resilient, shock-absorbent materials or components are commonly referred to in the shoe manufacturing industry as the midsole. Such resilient, shock-absorbent materials or components can also be applied to the insole portion of the shoe, which is generally defined as that portion of the shoe upper directly underlying the plantar surface of the foot.

Gas-filled bladders may be used for midsoles or inserts within the soles of shoes. The gas-filled bladders are generally inflated to significant pressures in order to cushion against the forces generated on the foot during strenuous athletic activities. Such bladders typically fall into two broad categories, those that are "permanently" inflated, such as disclosed in Rudy, U.S. Pat. Nos. 4,183,156 and 4,219,945, and those using a pump and valve system, such as those disclosed in, U.S. Pat. No. 7,051,456 and US Publications 2005/0132606, 2005/0022422, and 2002/0194747.

Athletic shoes of the type disclosed in U.S. Pat. No. 4,183,156 having "permanently" inflated bladders have been sold under the trademark "Air-Sole" and other trademarks by Nike, Inc. of Beaverton, Oreg. Permanently inflated bladders of such shoes are constructed using an elastomeric thermoplastic material that is inflated with a large molecule gas that has a low solubility coefficient, referred to in the industry as a "super gas." Permanent inflation also may be achieved with less expensive gasses like air or nitrogen. For example, U.S. Pat. Nos. 5,083,361 and 5,543,194 discloses selectively permeable sheets of film that are formed into a bladder and inflated with a gas or mixture of gases to a prescribed pressure.

The industry has moved away from using "super gas" because of the environmental impacts and the negative public image associated with it. For example, bladders in newer shoes are often filled with nitrogen. As a result, the bladders may be made with either multi-layer or micro-layer films. Examples of patents describing such air bladders include, but are not limited to U.S. Pat. Nos. 6,013,340; 6,082,025; 6,203,868; 6,391,405; 6,599,597; and 7,730,379, hereby incorporated by reference in their entirety.

Historically, colored inflatable bladders (such as airbags) have been produced by painting or from colored sheets, both of which involve the use of pigments. Painting results in uneven application and can be opaque in appearance. Painting can be a slow process and labor intensive. The use of colored sheets results in waste from colored trim scrap which has to be recycled for economic reasons.

Dyes are typically used in clear plastics to provide bright color and transparent shades where optical clarity is important. Examples include polycarbonate, polystyrene, PET and acrylics. Dyes are selected based on the solubility: they have to be soluble in these polymers. In other words, they are dispersed in the polymer matrix on the molecular level and therefore no scattering of the light occurs.

One inherent difficulty of coloring polymers with dyes is dye migration. Some dyes form covalent bonds with dyed polymers to prevent bleeding. However, most dyes lack the ability of forming such bond, hence have only poor to fair colorfastness in thermoplastics. Intermolecular interaction of the dyes with the substrates becomes important to minimize dye migration. The types of forces that may govern the interactions include, in the order of decreasing strength, electrostatic forces, hydrogen bonds and Van der Waals forces.

Over time, dyes will migrate from the substrate to the surface because of the mobility of dyes. To reduce the migration, the use of dyes is often limited to those polymers that have relatively high glass transition temperature (Tg). For example, the Tg of polycarbonate, polystyrene and PET are 145° C., 100° C. and 70° C., respectively, which are significantly higher than the typical temperatures that the polymers are being used. So the dye molecules are "frozen" in the polymers.

Thermoplastic elastomers such as polyurethane and polyether block amides are soft materials at ambient temperatures. Their Tg generally are much lower and therefore it is more difficult to prevent dye migration in those polymers.

BRIEF SUMMARY OF THE INVENTION

Embodiments of the invention are directed to producing colored inflatable bladders and other substrates with dyes that do not have problems with color migration. Such embodiments are consistent with lean manufacturing concepts that reduce or eliminate waste products.

A first aspect of the invention is a process for dyeing a thermoplastic elastomeric substrate comprising immersing the substrate in a heated dyeing system for a time sufficient to allow an amount of dye to diffuse into the substrate.

A second aspect of the invention is a process for dyeing an inflated bladder comprising immersing at least a portion of the inflated bladder in a heated dyeing system for a time sufficient to allow an amount of dye to diffuse into the bladder.

The heated dyeing system comprises at least one metal complex dye and a solvent system comprising water and may further contain an organic solvent.

A third aspect of the invention is directed to a bladder colored by a dyeing system comprising at least one metal complex dye and a solvent comprising at least water and optionally an organic solvent.

DETAILED DESCRIPTION OF THE INVENTION

It was discovered that metal complex dyes were particularly suited for coloring thermoplastic elastomers. These metal complex dyes are bulkier than other dyes and larger molecule dyes tend to have lower mobility minimizing dye migration. Moreover, they contain functional groups that can interact with the polymer substrate.

Suitable metal complex dyes include, but are not limited to, Bezanyl Black, Bezanyl Red, Bezanyl Yellow, Orasol Black, Orasol Blue GN, Orasol Red G, Orasol Yellow 2GLN, Isolan Blue, SP-R, Isolan Grey SP-G, Isolan Red SP-G, Isolan Yellow SP-2RL, Pylam Solvent Blue, Pylam Solvent Red, Pylam Solvent Yellow, Resofast Blue, Resofast Orange, and Resofast Yellow.

Suitable thermoplastic elastomers include, but are not limited to thermoplastic polyurethane (TPU), polyvinyl chloride, and polyether block amides (PEBAX). See U.S. Pat. No. 6,797,215, incorporated by reference in its entirety, for non-limiting examples.

A desired substrate is formed from the thermoplastic elastomers. Suitable substrates include membranes for inflatable bladders which have a variety of uses such as sports (balls), vehicles (tires) and shoes. Suitable membranes, such as for inflatable bladders, are described in U.S. Pat. No. 6,797,215, hereby incorporated by reference in its entirety. The membrane may be any suitable thickness but is typically about 0.1 to about 2 mm.

The metal complex dye is dissolved in a suitable solvent solution to form a dyeing system. The dye is generally added in amounts of 0.1 to 4 g/L, such as 1 to 3 g/L. The substrates are immersed in the dyeing system until the desired color and intensity is achieved. The color and intensity depends on the particular dye selected and the length of time the substrate is immersed in the dyeing system.

More particularly, colored substrates are prepared by immersing the substrate in a heated dyeing system comprising a solution of at least one dye in a solvent system. The dyeing system is heated to at least 35° C., typically 38 to 50° C. The transfer of dye from the dyeing system to the substrate typically takes about 10 to 30 minutes, but in some cases, can be as little as a few seconds up to a minute.

If inflated bladders are being dyed, the combination of heat and solvent during dyeing contributes to growth or expansion of the bladders; thus such combination may be tailored to be within an acceptable range for subsequent uses of the bladder. That is, the temperature of the heated solution and the time in solution should be such that growth of the bladder is limited. Generally, inflated airbags can be effectively dyed at temperatures between about 35 and about 55° C., such as between about 38 and about 45° C.

There are at least two types of metal complex dyes that can be used to color elastomeric substrates. Acid metal complex dyes are soluble in water and therefore dissolved in a water solvent system prior to use. Solvent metal complex dyes are insoluble in water and therefore dissolved in a water/organic solvent system prior to use.

The solvent system used for metal complex dyes should both dissolve the dyes and promote diffusion of dye molecules into the elastomeric substrates under mild conditions. Thus, it was discovered that certain organic solvents not only dissolve dyes that are insoluble in water such as solvent metal complex dyes, but also promote or facilitate dye diffusion into the polymer matrix of both acid metal complex and solvent metal complex dyes.

Suitable organic solvents include ethylene glycol phenyl ether (EGPE) and isopropanol. Generally a relatively smaller amount of organic solvent is needed.

A suitable solvent system for acid metal complex dyes contains, for example, 90 to 100 vol % water and 0 to 10 vol % organic solvent. Typical amounts of organic solvents are 0.5 to 7 vol % or 1 to 5 vol %.

A suitable solvent system for solvent metal complex dyes contains, besides water and ethylene glycol phenyl ether, a third component, usually an organic solvent, to increase the solubility of dyes. For example, the solvent system may contain 40 to 80 vol % water and 60 to 20 vol % organic solvent. Suitable organic solvents include, but are not limited to, alcohols, ethers, esters and ketones. Suitable solvent metal complex dyes include Orasol Yellow 2RLN, Orasol Yellow 2GLN-M, Pylam Solvent Red, Pylam Brilliant Yellow, and Resofast Orange M2Y.

Alternatively, a two phase solvent system may be used wherein the dye is soluble in the organic solvent, but not in the water and the organic solvent is only partially miscible in water or insoluble or nearly insoluble in water. Suitable organic solvents to form a two-phase system include those that are polar and insoluble in water such as suitable hydrocarbons, alcohols, aldehydes, ketones, ethers, esters, amides, acids, and halogenated compounds. Examples include, but are not limited to, n-butanol, cyclohexanol, butyl acetate, and ethylene glycol phenyl ether.

In a two-phase solvent system, a solution is prepared containing a major amount of water and a minor amount of an organic solvent. The organic solvent is either partially miscible with water or nearly insoluble in water such that the water and organic solvent form a two phase system. The two-phase solvent composition allows fast and uniform dyeing of articles.

The dye may be first dissolved in the organic solvent to form a uniform solution and then the solution may be dispersed in the water as droplets under agitation or stirring. Alternatively, the organic solvent may be combined with the water to form a two-phase solvent. The dye is then added to the two-phase solvent under agitation or stirring to form droplets.

A two-phase solvent composition can contain 1 to 30 vol %, for example, 1 to 25 vol %, organic solvent, and 70 to 99 vol %, for example, 75 to 99 vol %, water. These two-phase solvent compositions are particularly suitable for solvent dyes that have high solubility in organic solvents. Generally, dyes suitable for use in this embodiment include those that are highly soluble in organic solvent, but nearly insoluble in water.

When suitable substrates are immersed in the two-phase solvent dye system, droplets of organic solvent and dye are preferentially adsorbed onto the surface of the substrate. This creates a thin layer of organic solvent with a high concentration of dye on the surface of the substrate. In addition, the organic solvent causes the substrate to swell providing an open polymeric structure. The combination of such open structure in the substrate and high concentration of dye facilitates fast diffusion of dye molecules into the substrate.

Thus, the two-phase solvent composition both dissolves dyes and promotes diffusion of dye molecules into flexible substrates under mild conditions. Compared with conventional dyeing systems, the two-phase solvent dye system provides fast dyeing, uses less organic solvent, uses mild dyeing conditions, and provides potential for effective dye recovery/removal from solvent.

Colored substrates produced with the dyeing system of the present invention have good colorfastness reducing problems with color migration and have an improved visual appearance over color substrates produced from painting. Moreover, substrates such as inflated bladders colored with the instant dyeing system have better transparency than those prepared with colored sheets that use pigments as colorants.

Processes utilizing the dyeing system of the present invention are more cost effective than prior art methods as it eliminates the waste of color trim scrap. Thus, the process is consistent with lean manufacturing concepts and reduces labor costs.

EXAMPLES

Examples 1-3 illustrate migration resistance of various dyes. The solvent and dyeing conditions vary depending upon the type of the dye used to ensure that the desired color intensity is achieved. In general, the acid metal complex dyes were dissolved in a mixture of water and EGPE at the concentration of 2 g/L and dyeing was carried out at 40° C. for 20 minutes. The water/isopropanol/EGPE mixture was used for the solvent metal complex dyes and dyeing was done at 40° C. for 10 minutes. The disperse dyes were applied in water/IPA at 40° C. for 10 minutes.

Example 1

1"×2" TPU and PEBAX chips were hung in the dye solution at 40° C. for a pre-determined period of time, at the end of which the dyed samples were removed from the dye bath, rinsed with tap water or IPA, and then dried in a convection oven at 55° C. for about 15 minutes.

The colored parts of TPU and PEBAX were sandwiched between testing substrates. These include multi-fiber strip, white polyurethane (PU) coated leather, white PU coated synthetic leather, PU foam, and ethyl vinyl acetate (EVA) foam. The sandwiched substrates were then placed between two aluminum plates tightened with a rubber band to make sure that the TPU or PEBAX parts were in close contact with the testing substrates. The prepared samples were placed in oven at 70° C. for 5 days. Migration of color from the colored parts to the white substrates was examined after 5 days.

Table 1 (TPU) and Table 2 (PEBAX) summarize the results of migration test to various substrates. In general, metal complex dyes had the best results.

TABLE 1

| Dye | Type | Multifiber | Synthetic leather | Leather | PU foam | EVA foam |
|---|---|---|---|---|---|---|
| Bezanyl Black | Metal-complex | No | Light | Light | Light | No |
| Bezanyl Red | Metal-complex | No | Light | Light | Moderate | No |
| Bezanyl Yellow | Metal-complex | No | No | No | Moderate | No |
| Orasol Black | Metal-complex | No | Light | Light | Light | No |
| Orasol Blue GN | Metal-complex | No | No | No | Light | No |
| Orasol Red G | Metal-complex | No | Moderate | Moderate | Heavy | Moderate |
| Orasol Yellow 2GLN | Metal-complex | No | No | No | Moderate | Light |
| Isolan Blue SP-R | Metal-complex | No | Light | Light | Moderate | No |
| Isolan Grey SP-G | Metal-complex | No | Light | Light | Moderate | No |
| Isolan Red SP-G | Metal-complex | No | Moderate | Moderate | Heavy | No |
| Isolan Yellow SP-2RL | Metal-complex | No | No | No | Light | No |
| Pylam Solvent Blue | Metal-complex | No | No | No | Light | No |
| Pylam Solvent Red | Metal-complex | No | Light | No | Light | No |
| Pylam Solvent Yellow | Metal-complex | No | No | No | Moderate | No |
| Resofast Blue | Metal-complex | No | No | No | Light | No |
| Resofast Orange | Metal-complex | No | No | No | Moderate | Light |
| Resofast Yellow | Metal-complex | No | No | No | Moderate | No |
| Dianix Black CC-R | Disperse | No | No | No | Moderate | No |
| Dianix Yellow CC | Disperse | No | Light | No | Moderate | No |
| Dianix Navy CC | Disperse | No | Light | No | Moderate | No |
| Dianix Rubine CC | Disperse | No | Heavy | Moderate | Heavy | moderate |
| Resoplast | Disperse | No | Moderate | Light | Heavy | Moderate |

TABLE 2

| Dye | Type | Multifiber | Synthetic leather | Leather | PU foam | EVA foam |
|---|---|---|---|---|---|---|
| Bezanyl Black | Metal-complex | No | No | No | Light | No |
| Bezanyl Red | Metal-complex | No | No | No | No | No |
| Bezanyl Yellow | Metal-complex | No | No | No | No | No |
| Orasol Black | Metal-complex | No | No | No | Light | No |
| Orasol Blue GN | Metal-complex | No | No | No | Light | No |
| Orasol Red G | Metal-complex | No | Moderate | No | Moderate | Light |
| Orasol Yellow 2GLN | Metal-complex | No | No | No | Moderate | Light |
| Isolan Blue SP-R | Metal-complex | No | No | No | Light | No |
| Isolan Grey SP-G | Metal-complex | No | No | No | Light | No |
| Isolan Red SP-G | Metal-complex | No | No | No | Light | No |

TABLE 2-continued

| Dye | Type | Multifiber | Synthetic leather | Leather | PU foam | EVA foam |
|---|---|---|---|---|---|---|
| Isolan Yellow SP-2RL | Metal-complex | No | No | No | No | No |
| Pylam Solvent Blue | Metal-complex | No | No | No | Light | No |
| Pylam Solvent Red | Metal-complex | No | No | No | Light | No |
| Pylam Solvent Yellow | Metal-complex | No | No | No | Moderate | No |
| Resofast Blue | Metal-complex | No | No | No | Light | No |
| Resofast Orange | Metal-complex | No | No | No | Light | No |
| Resofast Yellow | Metal-complex | No | No | No | Moderate | No |
| Dianix Black CC-R | Disperse | No | No | No | light | No |
| Dianix Yellow CC | Disperse | No | No | No | Moderate | No |
| Dianix Navy CC | Disperse | No | Light | No | Moderate | Moderate |
| Dianix Rubine CC | Disperse | No | Moderate | Light | Moderate | Light |
| Resoplast | Disperse | No | Light | No | Moderate | Moderate |

Example 2

A piece of dyed TPU was placed tightly against a piece of undyed TPU. A piece of thick fabric was placed on each side of the sample to allow the moisture permeation. The specimen was laid flat on an aluminum plate and an aluminum block was added on top to make sure the colored TPU is in close contact with the uncolored one. The samples were put in oven at 40° C., 90% RH for 7 days. The migration results are shown in Table 3.

TABLE 3

| Dye | Type | Level of dye migration |
|---|---|---|
| Bezanyl Black | Metal complex | Light |
| Bezanyl Yellow | Metal complex | Light |
| Bezanyl Red | Metal complex | Light |
| Maxilon Blue SL 200 | Basic | Moderate |
| Maxilon Red GRL GR200 | Basic | Light |
| Maxilon Yellow GL GR | Basic | Light |
| Pylam Solvent Blue | Metal-complex | Light |
| Pylam Solvent Red | Metal-complex | Light |
| Pylam Solvent Yellow | Metal-complex | Light |
| Resofast Blue | Metal complex | Light |
| Resofast Orange | Metal complex | Light |
| Resofast Black | Metal complex | Light |
| Resofast Yellow | Metal complex | Light |
| Bemacron Rubine S-2GFL | Disperse | Heavy |
| Bemacron Red SE-RDL | Disperse | Heavy |
| Bemacron Yellow SE-RDL | Disperse | Heavy |
| Bemacron Blue S-BGL 200 | Disperse | Heavy |
| Pylakrome Bright Red | Disperse | Heavy |
| Pylakrome Bright Blue | Disperse | Heavy |
| Pylakrome Bright Orange | Disperse | Heavy |
| Orcosolve Red 4B | Disperse | Moderate |
| Orcocolve Blue B | Disperse | Moderate |
| Orcosolve Yellow KB | Disperse | Moderate |
| Macrolex Fluorescent Yellow 10GN | Solvent | Moderate |
| Macrolex Red G | Solvent | Moderate |
| Macrolex Red H | Solvent | Heavy |
| Macrolex Blue 3R | Solvent | Moderate |
| Macrolex Fluorescent Red G | Solvent | Moderate |
| Macrolex Yellow G | Solvent | Heavy |

Example 3

Footwear midsoles were molded using PU foam and dyed airbags. The midsoles were heated in an oven at 70° C. for 5 days. The degree of color migration is summarized in Table 4.

TABLE 4

| Dye | Type | Migration |
|---|---|---|
| Isolan Blue SP-R | Metal complex | Light |
| Isolan Grey | Metal complex | Light |
| Isolan Yellow SP-2RL | Metal complex | Light |
| Isolan Red SP-G | Metal complex | Light |
| Dianix Blue CC | Disperse | Heavy |
| Dianix Rubine CC | Disperse | Heavy |
| Dianix Yellow CC | Disperse | Light |
| Dianix Yellow Brown CC | Disperse | Heavy |

In a separate test, the midsoles with dyed bags were heated in an oven at 40° C., 90% RH for one month. They were then removed from the oven and left in the air at ambient temperatures for about a year. Color migration was examined and recorded in Table 5.

TABLE 5

| Dye | Type | Migration |
|---|---|---|
| Resofast Black MG | Metal complex | Light |
| Resofast Blue E5G | Metal complex | No |
| Bezanyl Yellow | Metal complex | Light |
| Bezanyl Black | Metal complex | Light |
| Bezanyl Yellow | Metal complex | Light |
| Pylam Solvent Blue | Metal-complex | No |
| Pylam Solvent Red | Metal-complex | Light |
| Pylam Bright Yellow | Metal-complex | Light |
| Maxilon Red GRL 200 | Basic | Moderate |
| Maxilon Blue SL 200 | Basic | Moderate |
| Keysperse Blue AFR | Disperse | Heavy |
| Permasil Red 2GH | Disperse | Heavy |
| Permasil Black GRE | Disperse | Heavy |

Generally, for dyed TPU, metal complex dyes had the best colorfastness and the disperse dyes had the worst, as examples 1-3 showed. In addition, the degree of migration depended on the materials. No migration occurred from either TPU or PEBAX to any of the fabrics tested. Migration to synthetic leather, leather, and EVA foam were mostly non-existent or light for metal complex dyes, but were more pronounced for disperse dyes. Both the metal complex and disperse dyes showed the worst bleeding when tested against TPU sheet or PU foam, but the former performed better.

Example 4

Inflated airbags undergo expansion at elevated temperatures. A series of dyeing conditions were tested to determine the effective dyeing temperatures and time for limited growth. The bags were dyed with Bezanyl Red S-RB using a solvent of 2% ethylene glycol phenyl ether and 98% water. The average height of points A (front) and B (back) of the bags were measured after dyeing. The results are summarized in Table 6.

TABLE 6

| Dyeing condition | Point A (mm) | Point B (mm) |
|---|---|---|
| 40° C., 10 minutes | 17.23 | 26.46 |
| 40° C., 20 minutes | 17.31 | 26.54 |
| 40° C., 30 minutes | 18.09 | 27.35 |
| 50° C., 5 minutes | 19.17 | 27.46 |
| 50° C., 10 minutes | 19.57 | 28.06 |

The upper limits for points A and B are 17.7 and 27.3 mm, respectively. A temperature of 40° C. for 20 minutes provided effective results. Longer dyeing time or higher temperature caused the bag to exceed specifications.

The following examples show the effect of organic solvent on the color intensity of dyed TPU and PEBAX.

Example 5

Twelve organic solvents that dissolve or swell thermoplastic polyurethane (TPU) were tested. The dyeing quality of each solvent at 5% by volume in aqueous solution at 60 and 80° C. was examined. Two dyes were used: a disperse Permasil Blue BGE and a solvent Macrolex Red Violet R Gran. The color intensity is summarized in Table 7.

TABLE 7

| | Permasil Blue BGE | | Macrolex Red Violet R Gran | |
|---|---|---|---|---|
| Solvent | 60° C. | 80° C. | 60° C. | 80° C. |
| Ethyl lactate | Light | Light | Light | Light |
| Dibasic ester-2 | Light | Light | | Insoluble |
| Cyclohexanol | Medium | Medium | Dark | Dark |
| Propylene carbonate | Light | Light | Light | Light |
| Ethylene glycol phenyl ether | Medium | Medium | Dark | Dark |
| 1-Methoxy-2-propanol | Light | Light | | Insoluble |
| 3-Methoxy-1-butanol | Light | Medium | | Insoluble |
| 2-Methoxyethyl Ether | Light | Light | | Insoluble |
| Diethylene glycol ethyl ether | Light | Medium | | Insoluble |
| 1,4-cyclohexane dimethanol | Medium | Medium | | Insoluble |
| 4-Hydroxy-4-methyl-2-pentanone | Light | Medium | | Insoluble |
| 1-Methoxy-2-propanol acetate | Light | Medium | Light | Light |

Cyclohexanol and ethylene glycol phenyl ether were the most effective solvents for both dyes. However, the color was very uneven in appearance for both solvents because the concentration of organic solvents employed in the study exceeded their maximum solubilities.

In a separate study, a metal complex dye, Isolan Red SP-G, was tested in selected organic solvents. The dye concentration was 2 g/L. All samples were dyed at 40° C. for 20 minutes. Table 8 summarizes the results.

TABLE 8

| Solution | Color intensity |
|---|---|
| 30% Ethyl lactate | Light |
| 30% 1-Methoxy-2-propanol | Light |
| 10% 3-Methoxy butanol | Light |
| 2% Dibasic ester | Medium |
| 2% EGPE | Medium |
| 0.5% Butyl acetate | Medium |

Ethylene glycol phenyl ether, dibasic ester, and butyl acetate were most satisfactory to generate good color intensity.

Example 6

The effect of salt on dyeing performance with an acid metal complex dye is shown in Table 9. Isolan Red SP-G was used at a concentration of 2 g/L and the dyeing temperature was 40° C. for 20 minutes.

TABLE 9

| Solution | 10 minutes | 20 minutes |
|---|---|---|
| 100% water | Light | Light |
| 2% EGPE, 98% water | Medium | Medium |
| 2 wt % NaCl in water | Light | Medium |
| 2 wt % NaCl in 2% EGPE/98% water | Medium | Medium |

Example 7

For acid metal complex dyes such as Isolan Red, a low concentration of organic solvent is sufficient for dyeing. However, because of the relatively low solubility of the dye, a higher concentration of organic solvent is necessary to achieve good coloration with solvent metal complex dyes. The following example illustrates the performance of the dyes in the solution with higher organic solvent concentration.

All TPU and PEBAX samples were prepared in an isopropanol/water, 50/50 by volume, solution for 20 minutes at 40° C. The dye concentration was 2 g/L. Some of the dyes did not fully dissolve in the solution at 2 g/L. Results are shown in Table 10.

TABLE 10

| Dye | TPU | PEBAX |
|---|---|---|
| Orasol Yellow 2RLN | Medium | Medium |
| Orasol Red G* | Medium | Medium |
| Orasol Blue GN* | Medium | Medium |
| Orasol Black RLI* | Medium | Medium |
| Orasol Yellow 2GLN-M | Medium | Medium |
| Pylam Solvent Red | Light | Dark |
| Pylam Solvent Blue* | Medium | Medium |
| Pylam Brilliant Yellow | Medium | Medium |
| Resofast Blue E5-G* | Medium | Medium |
| Resofast Orange M2Y | Medium | Dark |
| Resofast Black MG* | Dark | Dark |
| Resofast Orange MR* | medium | Medium |
| Bezanyl Black S-RL | medium | Dark |
| Bezanyl Yellow S-2R | Light | Dark |
| Bezanyl Red S-RB | Light | Dark |
| Isolan Blue SP-R | Light | Light |
| Isolan Red SP-G | Light | Light |
| Isolan Yellow SP-2RL | No color | Light |

*indicates the dyes are not completely soluble

Most solvent metal complex dyes performed reasonably well in the solvent. However, the acid metal complex dyes such as Bezanyl and Isolan dyes had difficulty in achieving good color intensity with high organic content for TPU.

The following examples show the dyeing performance in a two-phase dye solution.

Example 8

0.2 g of Macrolex Blue 3R Gran, a solvent dye from Lanxess, was added to a mixture of 20 ml of n-butanol and 80 ml of water at room temperature. Upon stirring, the dye was dissolved slowly in butanol. The solution was heated to 75° C. A 45-mil (1.14 mm) thick thermoplastic polyurethane (TPU) film was placed in the solution for 1 minute, rinsed with butanol, and dried. The film was mostly uniform in color with a few dark spots in various locations. When the stirring (agitation) stopped, the dye solution underwent phase separation to form a deep blue layer floating on almost colorless water.

The two phases can be easily separated with a separatory funnel and the dye can be recovered by removing the organic solvent.

Comparative Example 8a 0.2 g of Macrolex Blue 3R Gran was added to a homogeneous solution of 10% diethylene glycol, 20% 2-butoxyethanol and 70% water. The solution was heated to 75° C. A 45-mil (1.14 mm) thick TPU film was placed in the solution for 1 minute, rinsed with water, and dried. The film was mostly uniform but somewhat lighter than Example 1, in color with a few dark spots in various locations.

Comparative Example 8b 0.2 g of Macrolex Blue 3R Gran was added to a homogeneous solution of 30% isopropanol and 70% water. The solution was heated to 75° C. A 45-mil (1.14 mm) thick TPU film was placed in the solution for 1 minute, rinsed with water, and dried. The film was mostly uniform, but somewhat lighter than Example 1, in color with a few dark spots in various locations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A process for dyeing a thermoplastic elastomeric substrate comprising immersing the substrate in a heated dyeing system for a time sufficient to allow an amount of dye to diffuse into the substrate wherein the heated dyeing system comprises at least one metal complex dye and a solvent system comprising water, wherein the temperature of the heated dye solution is at least about 30 to about 70° C. wherein the thermoplastic elastomeric substrate comprises thermoplastic polyurethane or polyether block amide and wherein said metal complex dye is an acid solvent dye selected from the group consisting of Bezanyl Black, Bezanyl Red, Bezanyl Yellow, Orasol Black, Orasol Blue GN, Orasol Red G, Orasol Yellow 2GLN, Isolan Blue SR-R, Isolan Grey SP-G, Isolan Red SP-G, Isolan Yellow SP-2RL, Pylam Solvent Blue, Pylam Solvent Red, Pylam Solvent Yellow, Resofast Blue, Resofast Orange and Resofast Yellow.

2. The process of claim 1 wherein the solvent system further comprises at least an organic solvent.

3. The process of claim 2 wherein the organic solvent is selected from the group consisting of alcohols, cyclic ethers, esters, ketones, and mixtures thereof.

4. The process of claim 2 wherein the organic solvent is selected from the group consisting of cyclohexanol, ethylene glycol phenyl ether, butyl acetate, and mixtures thereof.

5. The process of claim 1 wherein the concentration of metal complex dye in the solvent is about 0.1 to about 4 g/L.

6. The process of claim 5 wherein the concentration of metal complex dye in the solvent is about 1 to about 3 g/L.

7. The process of claim 1 wherein the temperature of the heated dye solution is at least about 38° C. to about 50° C.

8. The process of claim 1 wherein the solvent system comprises 90 to 100 vol % water and 0 to 10 vol % of an organic solvent.

9. The process of claim 8 wherein the solvent system comprises 0.5 to 7 vol % of an organic solvent.

10. The process of claim 1 wherein the solvent system comprises 40 to 80 vol % water and 60 to 20 vol % of an organic solvent.

11. The process of claim 10 wherein the solvent system comprises at least one organic solvent and a component to increase the solubility of dyes.

12. The process of claim 11 wherein the organic solvent comprises ethylene glycol phenyl ether and a component selected from the group consisting of alcohols, ethers, esters, ketones, and mixtures thereof.

13. The process of claim 1 wherein the solvent system further comprises an organic solvent that is partially miscible with water or insoluble or nearly insoluble in water.

14. The process of claim 13 wherein the organic solvent is selected from the group consisting of hydrocarbons, alcohols, aldehydes, ketones, ethers, esters, amides, acids, and halogenated compounds.

15. A process for dyeing an inflated bladder comprising immersing at least a portion of the inflated bladder in a heated dyeing system for a time sufficient to allow an amount of dye to diffuse into the bladder wherein the heated dyeing system comprises at least one metal complex dye and a solvent system comprising water; wherein the temperature of the heated dye solution is at least about 30 to about 70° C. wherein the bladder comprises themoplastic polyurethane or polyether block amide and wherein the metal complex dye is selected from the group consisting of Bezanyl Black, Bezanyl Red, Bezanyl Yellow, Orasol Black, Orasol Blue GN, Orasol Red G, Orasol Yellow 2GLN, Isolan Blue SR-R, Isolan Grey SP-G, Isolan Red SP-G, Isolan Yellow SP-2RL, Pylam Solvent Blue, Pylam Solvent Red, Pylam Solvent Yellow, Resofast Blue, Resofast Orange and Resofast Yellow.

16. The process of claim 15 wherein the solvent system further comprises an organic solvent.

17. The process of claim 15 wherein the temperature of the heated dye solution is at least about 38 to about 50° C.

18. The process of claim 15 wherein the inflated bladder is immersed for less than a time to over-inflate the bladder.

19. The process of claim 15 further comprising immersing the inflated bladder for up to 30 minutes.

20. The process of claim 15 wherein the inflated bladder is an inflated airbag.

21. A bladder comprising a thermoplastic elastomeric substrate colored by a heated dye solution comprising at least one metal complex dye and a solvent comprising water; wherein the temperature of the heated dye solution is at least about 30 to about 70° C. wherein the thermoplastic elastomeric substrate is selected from the group consisting of themoplastic polyurethane or polyethyer block amide and wherein the metal complex dye is selected from the group consisting of Bezanyl Black, Bezanyl Red, Bezanyl Yellow, Orasol Black, Orasol Blue GN, Orasol Red G, Orasol Yellow 2GLN, Isolan Blue SR-R, Isolan Grey SP-G, Isolan Red SP-G, Isolan Yellow SP-2RL, Pylam Solvent Blue, Pylam Solvent Red, Pylam Solvent Yellow, Resofast Blue, Resofast Orange and Resofast Yellow.

22. The bladder of claim 21 wherein the bladder is an airbag.

23. The bladder of claim 21 wherein the bladder comprises multi-layer or micro-layer films.

24. The bladder of claim 21 wherein the bladder is filled with nitrogen.

25. Footwear comprising the bladder of claim 21.

* * * * *

UNITED STATES PATENT AND TRADEMARK OFFICE
CERTIFICATE OF CORRECTION

PATENT NO. : 7,611,547 B2
APPLICATION NO. : 11/589299
DATED : November 3, 2009
INVENTOR(S) : Anna Bracken et al.

It is certified that error appears in the above-identified patent and that said Letters Patent is hereby corrected as shown below:

In Column 11, Claim 1, Line 57:
Please delete "water," and insert --water;--

In Column 11, Claim 1, Line 64:
Please delete "SR-R" and insert --SP-R--

In Column 12, Claim 7, Line 14:
Please delete "38° C." and insert --38° C--

In Column 12, Claim 11, Line 23:
Please delete "claim 10" and insert --claim 1--

In Column 12, Claim 15, Line 48:
Please delete "SR-R" and insert --SP-R--

In Column 13, Claim 21, Line 5:
Please delete "SR-R" and insert --SP-R--

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,611,547 B2 | Page 1 of 1 |
| APPLICATION NO. | : 11/589299 | |
| DATED | : November 3, 2009 | |
| INVENTOR(S) | : Bracken et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this

Fourteenth Day of December, 2010

David J. Kappos
*Director of the United States Patent and Trademark Office*